May 5, 1959 L. A. PRANTER 2,885,208
PHONOGRAPH RECORD PLAYER SPEED SELECTOR
Filed Aug. 24, 1953 2 Sheets-Sheet 1
Fig. 1.
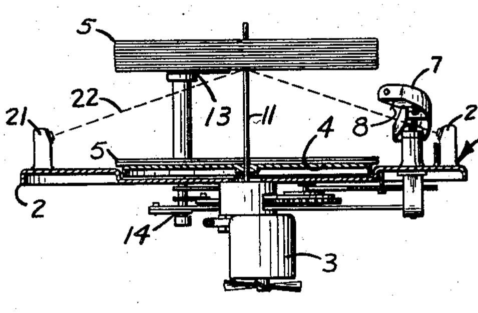
Fig. 2.
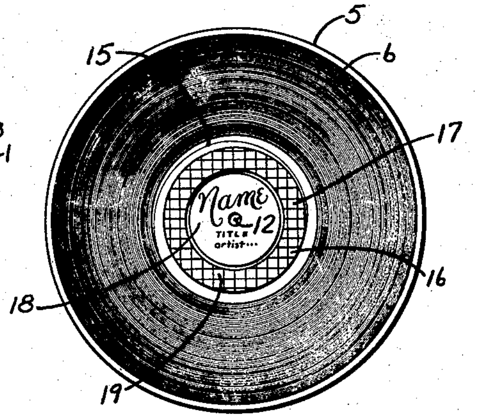
Fig. 3.
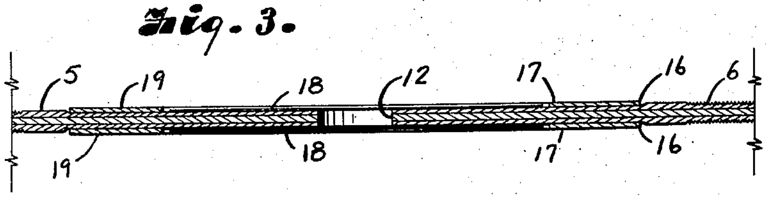
Fig. 4.
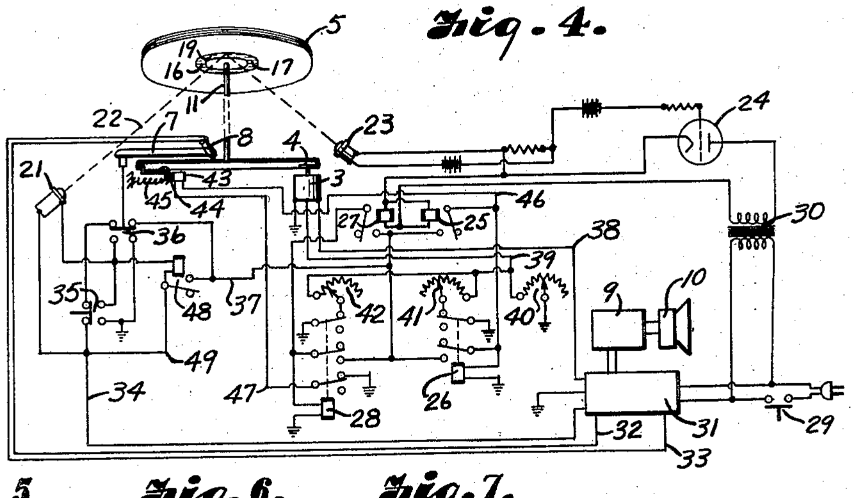
Fig. 5. Fig. 6. Fig. 7.
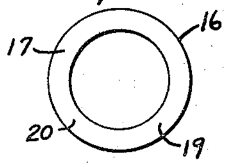
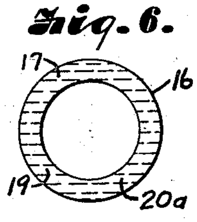
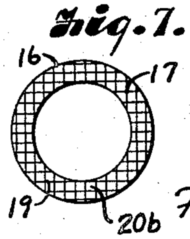
INVENTOR.
Lawrence A. Pranter.
BY
Fishburn & Mullendore
ATTORNEYS.

May 5, 1959 L. A. PRANTER 2,885,208

PHONOGRAPH RECORD PLAYER SPEED SELECTOR

Filed Aug. 24, 1953 2 Sheets-Sheet 2

INVENTOR.
Lawrence A. Pranter
BY
Fishburn & Mullendore
ATTORNEYS.

2,885,208

PHONOGRAPH RECORD PLAYER SPEED SELECTOR

Lawrence A. Pranter, Fort Worth, Tex.

Application August 24, 1953, Serial No. 376,219

5 Claims. (Cl. 274—10)

This invention relates to phonograph record players and particularly those having apparatus for accommodating a plurality of records and automatically dropping or moving them one at a time into playing position after completion of the record which was previously moved to playing position, and has for its principal object to provide an apparatus responsive to indicia on a record to be played for automatically selecting the speed of rotation of the turntable for the record to be played whereby a mixture of various or different speed records may be played in any sequence.

Phonograph record players with what is termed automatic record changers have been available for a number of years. In the majority of such structures, there is an arm with a needle therein which follows the grooves of the record being played and at the end of the selection the groove in the record is of different pitch and causes the arm to swing toward the center of the record to the end of the grooved portion. This swinging of the arm to the end of the grooved portion of the record effects closing of switches to energize electrically operated apparatus which lifts the arm and moves same beyond the periphery of the record, then moves or drops the next record into playing position and then moves the arm back into position to engage the needle in the groove of the record next to be played. There are at present on the market records and record players designed to be operated at 33, 45 and 78 revolutions per minute. Many times a selection with a particular artist is available on records designed to operate at one of the speeds and not available on records operating at the other speeds. There are phonograph record players now available which are capable of being operated at the different speeds but such record players are incapable of playing a mixture of different-speed phonograph records. In such machines the operator is required to either play all records of the same speed or to manually change the speed as each different-speed record comes into position to play.

Further objects of the present invention are to provide a phonograph record player capable of operating at different-speeds with an automatic speed selector and changer whereby a mixture of different-speed records may be arranged on a record player having an automatic record changer and the turntable rotated at the proper speed for the respective records as they are fed into playing position; to provide such a record player with apparatus which is responsive to indicia on the records to change the speed of the motor driven record turntable to that indicated by the indicia; to provide a control circuit which is energized responsive to indicia on the record to be played, said control circuit actuating a speed changer which controls the electric circuit to the record driving motor whereby the speed of rotation of the record is that indicated on the record; to provide a control circuit which is energized responsive to indicia on a record to be played to produce a signal which is amplified and then used to effect a change in the speed at which the turntable is driven; and to provide a phonograph record player speed selector which is economical to manufacture, efficient in operation and may be applied to conventional structures with little alteration whereby a mixture of different-speed records may be played at the proper speed in their turn.

In accomplishing these and other objects of the present invention, I have provided improved details of structure, the preferred forms of which are illustrated in the accompanying drawings, wherein:

Fig. 1 is a vertical sectional view through an automatic phonograph record player provided with a speed selector in accordance with the present invention.

Fig. 2 is a plan view of a phonograph record with a speed indicating indicia ring thereon.

Fig. 3 is an enlarged sectional view through the center portion of the record showing the position of the speed indicia thereon.

Fig. 4 is a diagrammatic view of the phonograph record player and speed selector.

Fig. 5 is a plan view of a ring for indicating one speed of rotation records.

Fig. 6 is a plan view of a ring indicating another speed of records.

Fig. 7 is a plan view of a ring for indicating a third speed for records.

Figures 8, 9, 10, 11, 12, 13, 14:
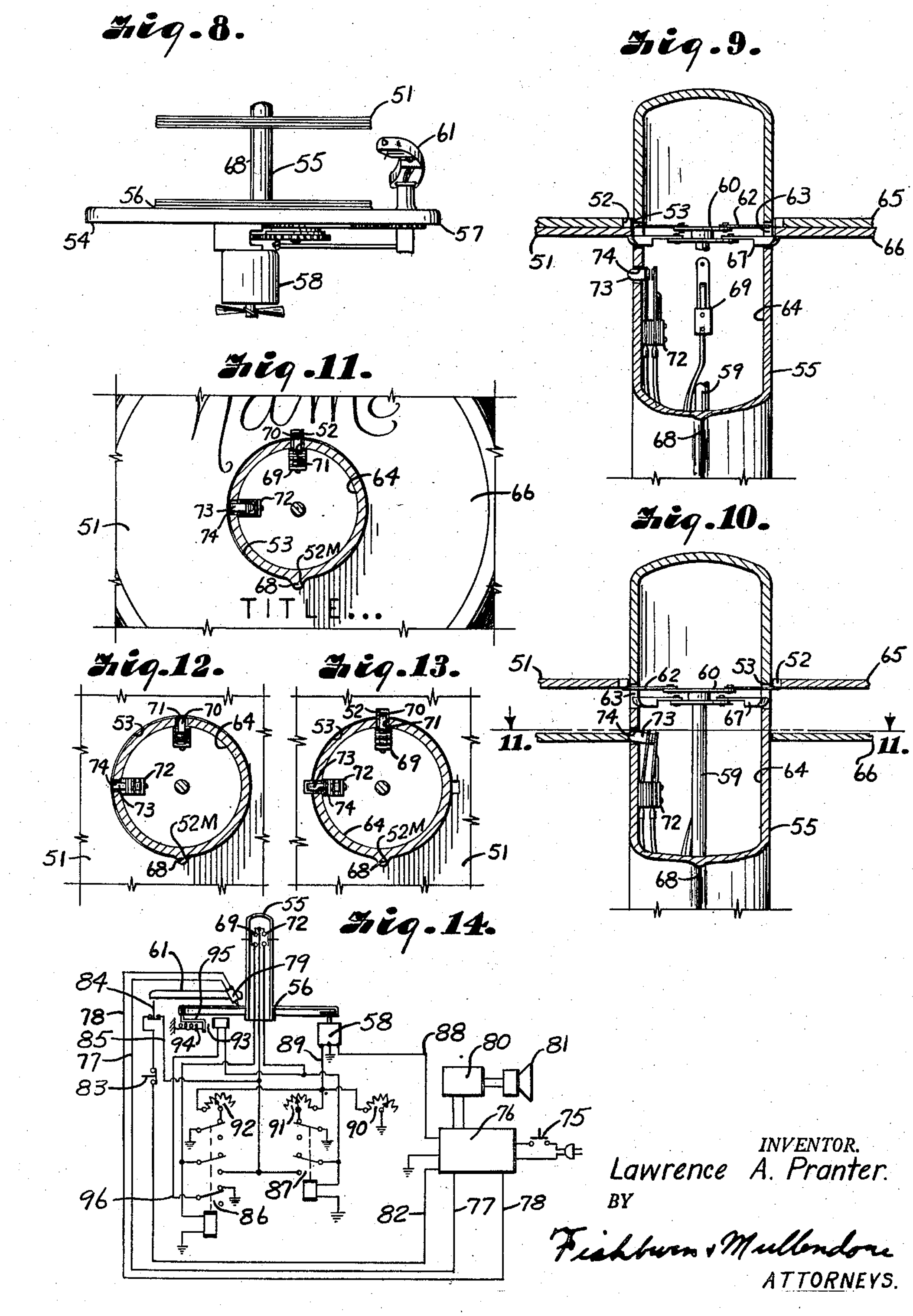
Fig. 8 is a side elevation of a record player having a modified form of speed selector thereon.
Fig. 9 is a sectional view through the upper portion of a record supporting pedestal, particularly showing the switches therein.
Fig. 10 is a sectional view similar to Fig. 9 showing a record moving downwardly on the pedestal.
Fig. 11 is a transverse sectional view through the pedestal on the line 11—11, Fig. 10.
Fig. 12 is a transverse sectional view through the pedestal showing a different-speed record moving downwardly thereon.
Fig. 13 is a transverse sectional view through the pedestal showing still another speed record moving downwardly thereon.
Fig. 14 is a diagrammatic view of the electric circuit of the record player and speed selector shown in Fig. 8.

Referring more in detail to the drawings:

1 designates a phonograph record player which includes a support 2 on which is carried a motor 3 operatively connected with a turntable 4 for rotating same to turn records 5 supported on said turntable. The records have faces provided with grooved portions 6 on which a selection is recorded. The record player 1 includes a playing arm 7 having a needle 8 adjacent one end thereof adapted to follow the groove in a face of the record, said needle being connected to a pickup to produce a signal in an amplifier 9 connected to a speaker 10 for audible reproduction of the selection recorded on the grooved face of the record. A spindle or pedestal 11 extends upwardly axially of the turntable 4, the upper end of said spindle being adapted to extend through axial apertures 12 of a plurality of records sleeved thereon and supported by a member 13 forming part of a conventional record changer apparatus 14. It is customary in such structures that when the electrical circuits of the record player are energized the record changer 14 moves or drops a record 5 onto the turntable 4 and the player arm 7 then moves over the periphery of the record and downwardly until the needle 8 engages the grooved portion 6 of the record. The record is rotated and the selection thereon reproduced. At the end of the selection the groove on the face of the record has a different pitch moving inwardly at a faster rate as at 15 and the needle following said groove moves the playing arm toward the spindle to a position at which the arm movement closes a switch to energize the record changer apparatus whereby the arm is lifted from the record and moved outwardly beyond the periphery thereof. Then the record changer mechanism moves or drops another record 5 onto the turntable 4 and the arm 7 is again moved over the record to engage the needle 8 with the grooved face thereof. The motor 3 is such that its speed of operation may be manually changed to drive the turntable to play different-speed records, for example records designed to operate at 33, 45 or 78 revolutions per minute. The structure above described is exemplary of record players now available.

The present invention consists of indicia 16 on the faces of the record to indicate the speed at which it is designed to be rotated, and in the structure illustrated in Figs. 1 to 7 inclusive the indicia 16 consists of rings 17 of thin material applied to the faces of the record between the grooved portion 6 and the name bearing portion 18 thereof. The rings 17 have exposed faces 19 of different light reflective characteristic for the different speeds, for example the face 19 of the ring indicating 78 revolutions per minute may be highly reflective, for example white or silver as indicated at 20, Fig. 5. The ring indicating 45 revolutions per minute may have a face which is gray in color as indicated at 20*a* in Fig. 6. The ring indicating 33 revolutions per minute may be black or nonreflective as indicated at 20*b*, Fig. 7. These particular colors are examples only as other colors or reflective qualities may be used providing they will produce a difference in the intensity or color of a reflected light beam 22 as picked up by a light sensitive device 23.

A light source 21 is arranged on the support 2 in position to direct a beam of light as indicated by the dotted line 22, onto the face 19 of a ring 17 on the lower surface of the lowermost record supported by the record change member 13. A light sensitive device, for example a photoelectric cell 23, is arranged on the support 2 in a position whereby when a beam of light from the light source 21 is directed on the face 19 of the ring 17 of the lowermost record, the light reflected from said face 19 will be directed to the light sensitive device 23 which will generate a signal current of electricity of distinct magnitude, according to the color or intensity of the incident light beam 22, which is amplified by the electron tube 24 and impressed across the parallel relays 25 and 27. As a result of the strength of the generated signal current, either one or both or neither of the relays 25 and 27 will momentarily close, according to the following arrangement: when the generated signal strength is relatively nil (when the lowermost record is a 33 r.p.m.), neither relay 25 or 27 will close; when the generated signal strength is relatively medium strength (when the lowermost record is a 45 r.p.m.), relay 25 will close; and when the generated signal strength is relatively high strength (when the lowermost record is 78 r.p.m.), both the relays 25 and 27 will close.

Referring to Fig. 4, the "off-on" switch 29 is "on" and a suitable source of alternating current is flowing into the transformer 30 and the rectifier 31; a suitable rectified current is flowing through conductors 32 and 33 to the pickup 8 on the tone arm 7 and back to the audio amplifier 9 and to the speaker 10; a low voltage rectified current is flowing through the conductor 34, through the "reject" switch 35 and the tone arm switch 36, through the conductor 37 to the open contacts on relays 25 and 26 and 27 and 28; a well regulated high voltage current flows from the rectifier 31 through the conductor 38 to the direct current electric motor 3 and back through conductor 39 to the parallel speed regulating resistances 40, 41 and 42, to the ground return, and back to the rectifier 31 via the ground.

Again referring to Fig. 4, when the listener moves the "reject" control on the phonograph chassis, it causes the switch 35 to break continuity through conductor 37 and to energize the light source 21 and relay 48. When the relay 48 closes, continuity to conductor 37 is reestablished. When the record finishes playing the change mechanism is tripped and the tone arm 7 swings toward the outside periphery of the turntable 4. It trips the switch 36 and the light source 21 flashes momentarily. Assuming the lowermost record has a playing speed of 78 r.p.m., the reflected light beam 22 causes the generation of a relatively high strength signal current within the light sensitive device 23, which, when amplified, causes both relays 25 and 27 to close momentarily. As relay 25 closes momentarily, then the current in conductor 37 passes the closed contact points, through the windings of relay 26 to the ground return, causing relay 26 to close. When relay 26 closes the current in conductor 37 passes the closed contact points, through the windings of relay 26 to the ground return, and thereby holds relay 26 closed after relay 25 opens. Until one of the switches 35 or 36 is tripped, relay 26 will remain energized. Regarding the action of relays 27 and 28, they will react exactly the same as did relays 25 and 26 above. It should be noted here that had the lowermost record been of 45 r.p.m. playing speed, the result would be that relay 26 alone is energized, and if the lowermost record had been of 33 r.p.m. playing speed the result would be that neither relay 26 or 28 is energized.

The motor driving electrical current passes through conductor 39 to several combinations of the speed control resistances 40, 41 and 42 which are, electrically speaking, in series with the motor field windings. The resistances are the adjustable or trimming type so that exact motor speed may be set by the service mechanic. Furthermore the speed control resistances 40, 41 and 42 are in parallel with each other, electrically speaking, so that their combined resistance is less than their individual resistances and when all three resistances are electrically connected through relays 26 and 28, the motor 3 turns at the fixed speed to drive the turntable 4, through a suitable reduction gearing, at 33 r.p.m., and when relay 26 is energized leaving only resistances 40 and 42 electrically connected, the motor speed will be such that the turntable 4 speed will be 45 r.p.m., and when both the relays 26 and 28 are energized and only the resistance 40 is electrically connected, the motor speed will be such that the turntable 4 speed will be 78 r.p.m.

When relay 25 closes, current from conductor 46 passes through the change mechanism solenoid 43 and back through conductor 47 and the contact points of relay 28 to ground. Relay 28 serves to prevent energizing the solenoid 43 except for the case of 45 r.p.m. speeds. When a 45 r.p.m. record is lowermost, then the solenoid 43 will energize and remain energized until relay 26 deenergizes and releases. When the solenoid 43 energizes it pulls a lever 44, which is a part of the change mechanism 14, which will shift the mechanism to cause the tone arm 7 to position itself to play the seven inch records common to 45 r.p.m. playing speeds. When the 45 r.p.m. record play is completed or rejected and the holding circuit to relay 26 is broken and the relay releases, then the holding circuit to the solenoid 43 is broken and the solenoid releases the lever 44 which the return spring 45 pulls back to the normal position for playing the conventional ten inch records of the other playing speeds.

It should be noted that when either switch 35 or 36 is tripped, there must be a definite time interval within the switching mechanism between that interruption of the normal circuit through the switch and the making of contact of the alternate circuit through the switch which energizes relay 48 and the light source 21. The need for the delay in switching is so that the relays 26 and 28 will have time to deenergize and release when the normal circuit through conductor 37 is interrupted. The purpose of the relay 48 is to provide a bridge around the open switch 35 or 36 by passing the electrical current from conductor 34 through conductor 49 to conductor 37 since the normal path of current flow to conductor 37 is broken by the open switch. Finally, since the relay 48 is a delayed opening type, the circuit through conductor 49 will be maintained for a suitable length of time until the switch 35 or 36 returns to normal position and reestablishes the normal circuit.

In the form of the invention illustrated in Figs. 8 to 14 inclusive, the indicia on the records 51 consists of a master notch 52M and selective notches 52 extending outwardly from the center aperture 53 thereof, the records 51 being of the type designed especially for, or of the conventional types modified especially for, operation on a record player 54 having a relatively large pedestal 55. In such a record player the pedestal 55 is fixed on a turntable 56, rotatably mounted on a support 57 and driven by a motor 58 also carried on the support 57. The pedestal 55 is hollow and extending upwardly therein is a shaft 59 operatively connected to the record changer apparatus 60 whereby, when the playing arm 61 moves to the end of the grooved face of the record being played, the playing arm is raised and swung outwardly beyond the periphery of the record, during which motion the shaft 59 is rotated to move fingers 62 connected thereto and extending outwardly in slots 63 in the wall 64 of the pedestal to engage under the record 65 next above the lowermost record 66 supported at the upper portion of the pedestal 55. As the fingers 62 move under said record 65, other fingers 67 also connected to the shaft 59 and extending through the slots 63 are withdrawn from under the lowermost record 66 to allow same to move downwardly on the pedestal into playing position. Then the shaft 59 is rotated to extend the fingers 67 and retract the fingers 62 whereby the record 65 is then supported on the fingers 67. The pedestal 55 has a rib 68 on the exterior thereof and extending the full length thereof. Arranged inside of the pedestal and diametrically opposite the rib 68 is a switch 69 having a lug 70 extending outwardly through an opening 71 in the wall of the pedestal. A switch 72 is arranged in the pedestal between the rib 68 and the switch 69 at a level slightly below that of switch 69 and has a lug 73 extending outwardly through an opening 74 and equally spaced around the pedestal from the lug 70 and rib 68. With this arrangement each record, regardless of speed at which it is designed to be operated, has one or more notches extending outwardly from the axial aperture 53 thereof, the axial aperture 53 being such that the records are freely slideable on the pedestal 55. While the notches 52 may be arranged as desired relative to the speed at which the record is to be played, in the structure illustrated in Fig. 11 when the records have two diametrically opposite notches 52 and 52M, the record is designed to be operated at 45 revolutions per minute and as the record moves down the pedestal one of the notches 52M will be registered with the rib 68 and the other notch 52 will be positioned relative to the lug 70 whereby said lug and the switch 69 will be undisturbed, but since the lug 73 does not register with any notch said lug will be moved inwardly relative to the pedestal and will close the switch 72.

The arrangement of the notches illustrated in Fig. 12 is for records designed to be rotated at 78 revolutions per minute, there being one notch 52M in the record whereby the notch will register with the rib 68 and will allow the record to drop down the pedestal. There being no other notches, movement of the record past the lugs 70 and 73 will move said lugs inwardly relative to the pedestal and will momentarily close the switches 69 and 72.

The arrangement of notches illustrated in Fig. 13 is for records designed to be rotated at 33 revolutions per minute and has four equally spaced notches 52 and 52M whereby the record could pass downwardly along the pedestal without disturbing either of the switches 69 or 72.

In all of the above descriptions, the notch 52M which must register with the rib 68 is of such shape that it alone, and no other notch, will register with the rib 68. This then fixes a master combination whereby the record cannot be misaligned on the pedestal.

As illustrated in the wiring diagram, Fig. 14, when the "off-on" switch 75 is "on" and a suitable source of alternating current is flowing into the rectifier 76, a suitable rectified current is flowing through conductors 77 and 78 to the pickup 79 on the tone arm 61 and back to the audio amplifier 80 and to the speaker 81; a low voltage rectified current is flowing through the conductor 82, through the "reject" switch 83 and the tone arm switch 84, through the conductor 85 to the open contacts on relays 86 and 87 and on switches 69 and 72; and a well regulated high voltage current flows from the rectifier 76 through the conductor 88 to the direct current electric motor 58 and back through conductor 89 to the parallel speed regulating resistances 90, 91 and 92, to the ground return and back to the rectifier 76 via the ground.

When the listener moves the "reject" control on the phonograph chassis, it causes the switch 83 to break continuity through the conductor 85 and thereby releases the holding relays 86 and 87, and the turntable speed returns to 33 r.p.m. At the same time the circuit to the change mechanism solenoid 93 is broken and the spring 94 pulls the change mechanism lever 95 back to the normal position for playing ten inch records. When the record finishes playing and the tone arm 61 swings out toward the periphery of the turntable 56, it trips the switch 84 which breaks the continuity to the conductor 85 and thereby releases the holding relays 86 and 87 and the turntable speed returns to 33 r.p.m. At the same time the circuit to the change mechanism solenoid 93 is broken and the spring 94 pulls the change mechanism lever 95 back to the normal position for playing ten inch records.

As the record changing apparatus 60 moves the fingers 62 and 67 to drop the next record onto the turntable, the notches 52 in said record will determine the circuits energized. If the notches are arranged as in Fig. 13, neither of switches 69 and 72 will be energized, and the turntable will continue at 33 r.p.m. and the record will play at 33 r.p.m. If the notches 52 in the record are arranged as in Fig. 11 the switch 72 will be actuated to energize relay 87 whereby current to the motor 58 will flow through the conductors 88 and 89 and through the parallel speed regulating resistances 90 and 92 and will operate said motor whereby the turntable is rotated at 45 revolutions per minute. Simultaneously the change mechanism solenoid 93 will be energized and will pull the change mechanism lever 95 to cause the tone arm to postion itself to play seven inch records. If the notches 52 are arranged in the record as shown in Fig. 12, movement of the record downwardly on the pedestal will close switch 69 to energize relay 86 and will close switch 72 to energize relay 87 whereby current will flow through conductor 88 to the motor 58 and through conductor 89 and speed regulating resistance 90 whereby the motor will operate to drive the turntable at 78 revolutions per minute. The relays 86 and 87 will remain in the same position until a record is completed or rejected.

It is believed obvious that I have provided record player apparatus responsive to indicia on records for automatically regulating the speed of the record player turntable to that for which the record was designed to be operated whereby a mixture of different-speed records may be played in any sequence.

What I claim and desire to secure by Letters Patent is:

1. In combination with a phonograph record player having a motor for driving a turntable for rotating records, a playing arm and mechanism advancing another of a plurality of records to playing position while the playing arm is moved clear of the record and then back into playing engagement therewith, a speed selector for the motor driven turntable comprising, means regulating the speed at which the turntable motor rotates the turntable, means directing a beam of light onto a portion of the next record to be played, said record portion having a light reflection characteristic indicating the speed said record is designed to rotate when being played, a control circuit, means responsive to the amount of the reflected light beam for effecting an electric current in said control circuit, and means responsive to energization of the control circuit for operating the speed regulating means and adjusting the speed of the turntable motor whereby said turntable is operated at the indicated speed.

2. In combination with an automatic phonograph record player having a variable speed motor for driving a turntable for rotating records, a playing arm and mechanism advancing another of a plurality of records to playing position while the playing arm is moved clear of the record and then back into playing engagement therewith, a speed selector for the motor driven turntable comprising, a speed controller for adjusting the turntable motor to operate at certain selected speeds, means directing a beam of light onto a portion of the next record to be played, said record portion having a light reflection characteristic indicating the speed said record is designed to rotate when being played, a control circuit, means responsive to the amount of the reflected light beam for effecting an electric current in the control circuit, and means responsive to the electric current in the circuit and connected to the speed controller for actuating same to adjust the speed of the turntable motor whereby said turntable is operated at the indicated speed.

3. In combination with an automatic phonograph record player having a variable speed motor for driving a turntable for rotating records, a playing arm and mechanism advancing another of a plurality of records to playing position while the playing arm is moved clear of the record and then back into playing engagement therewith, a speed selector for the motor driven turntable comprising, means directing a beam of light onto a portion of the next record to be played, said record portion having a light reflection characteristic indicating the speed said record is designed to rotate when being played, a control circuit, means responsive to the amount of the reflected light beam for effecting an electric current in the control circuit, means responsive to the electric current in the control circuit for adjusting the speed of the turntable motor whereby said turntable is operated at the indicated speed, and holding means for retaining the speed of the turntable motor until a record having a different light reflection characteristic causes the reflected light beam responsive means to effect a different current in the control circuit at time of selecting the next record to be played.

4. A speed selector for automatic phonograph record players for regulating the speed of rotation of a record in accordance with a speed indicia on the record comprising, a record turntable, means including an electric motor having speed variations for rotating the turntable at a speed corresponding to the designed speeds of the records to be played, means for regulating the speed at which the motor rotates the turntable, an electric circuit, means in the electric circuit responsive to the movement of the playing arm from a record being played for closing the electric circuit, means in the electric circuit and energized thereby for directing a beam of light onto a portion of the next record to be played, said record portion having a light reflective characteristic indicating the speed said record is designed to rotate when being played, a control circuit, means responsive to the amount of the reflected light beam for effecting an electric current in said control circuit, and means responsive to the electric current in the control circuit for adjusting the speed of the turntable motor whereby said turntable is operated at the indicated speed.

5. A speed selector for automatic phonograph record players for regulating the speed of rotation of a record in accordance with a speed indicia on the record comprising, a record turntable, means including an electric motor having speed variations for rotating the turntable at a speed corresponding to the designed speeds of the records to be played, means for regulating the speed at which the motor rotates the turntable, an electric circuit, means in the electric circuit responsive to the movement of the playing arm from a record being played for closing the electric circuit, means in the electric circuit and energized thereby for directing a beam of light onto a portion of the next record to be played, said record portion having a light reflective characteristic indicating the speed said record is designed to rotate when being played, a control circuit, means responsive to the amount of the reflected light beam for effecting an electric current in said control circuit, means responsive to energization of the control circuit for maintaining said circuit for a predetermined interval, and means responsive to the electric current in the control circuit for adjusting the speed of the turntable motor whereby said turntable is operated at the indicated speed.

References Cited in the file of this patent

UNITED STATES PATENTS

| | | |
|---|---|---|
| 2,027,427 | Hammond | Jan. 14, 1936 |
| 2,113,401 | Goldsmith | Apr. 5, 1938 |
| 2,776,838 | Mueller | Jan. 8, 1957 |